Aug. 12, 1947.  D. G. C. LUCK  2,425,383
RADIO DIRECTION FINDING
Filed May 31, 1943  2 Sheets-Sheet 1
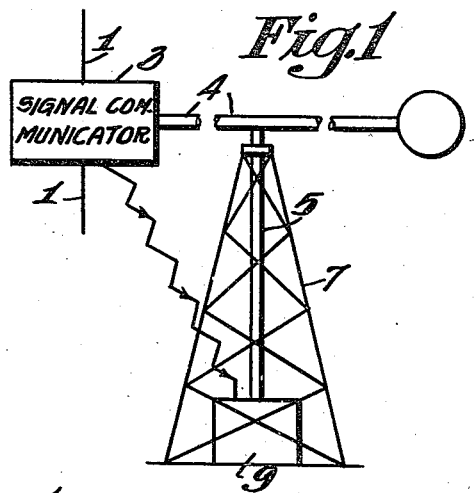
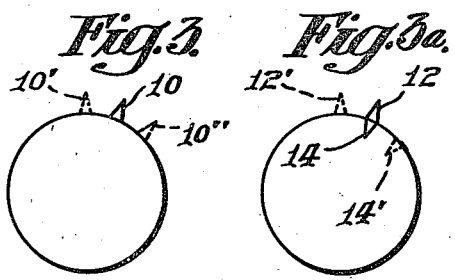
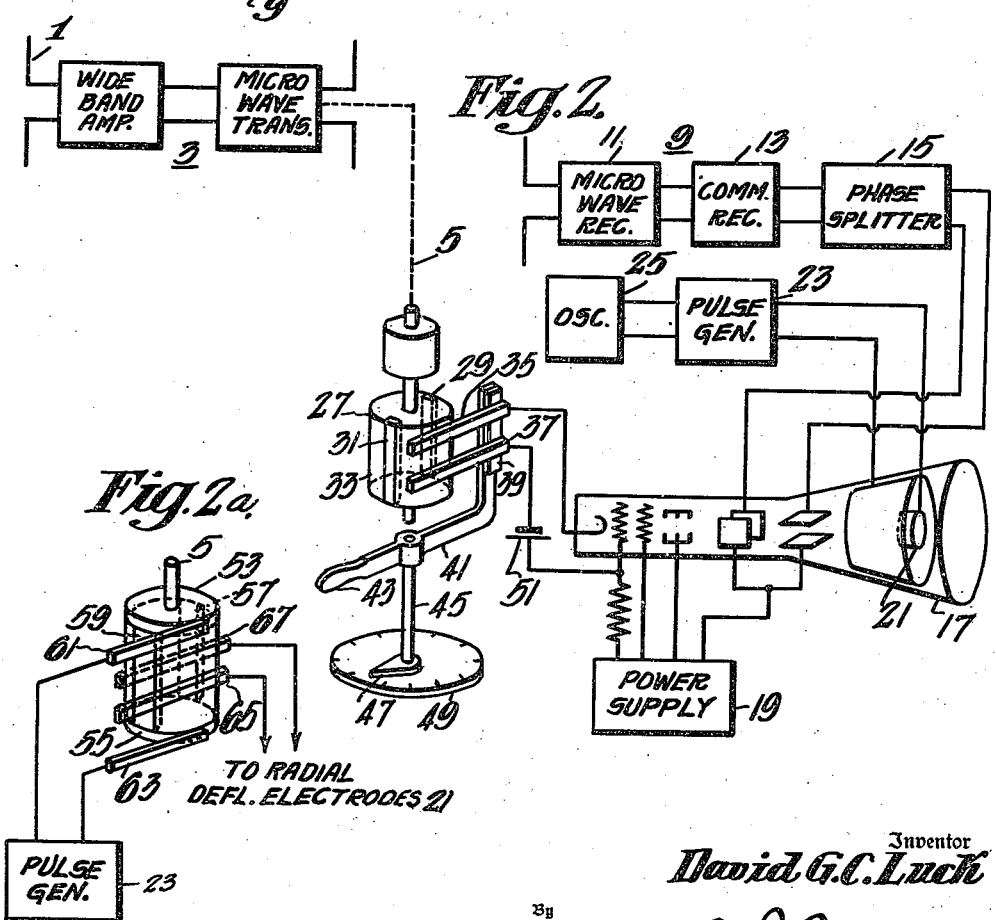
Inventor
David G. C. Luck
By
C. D. Truska
Attorney

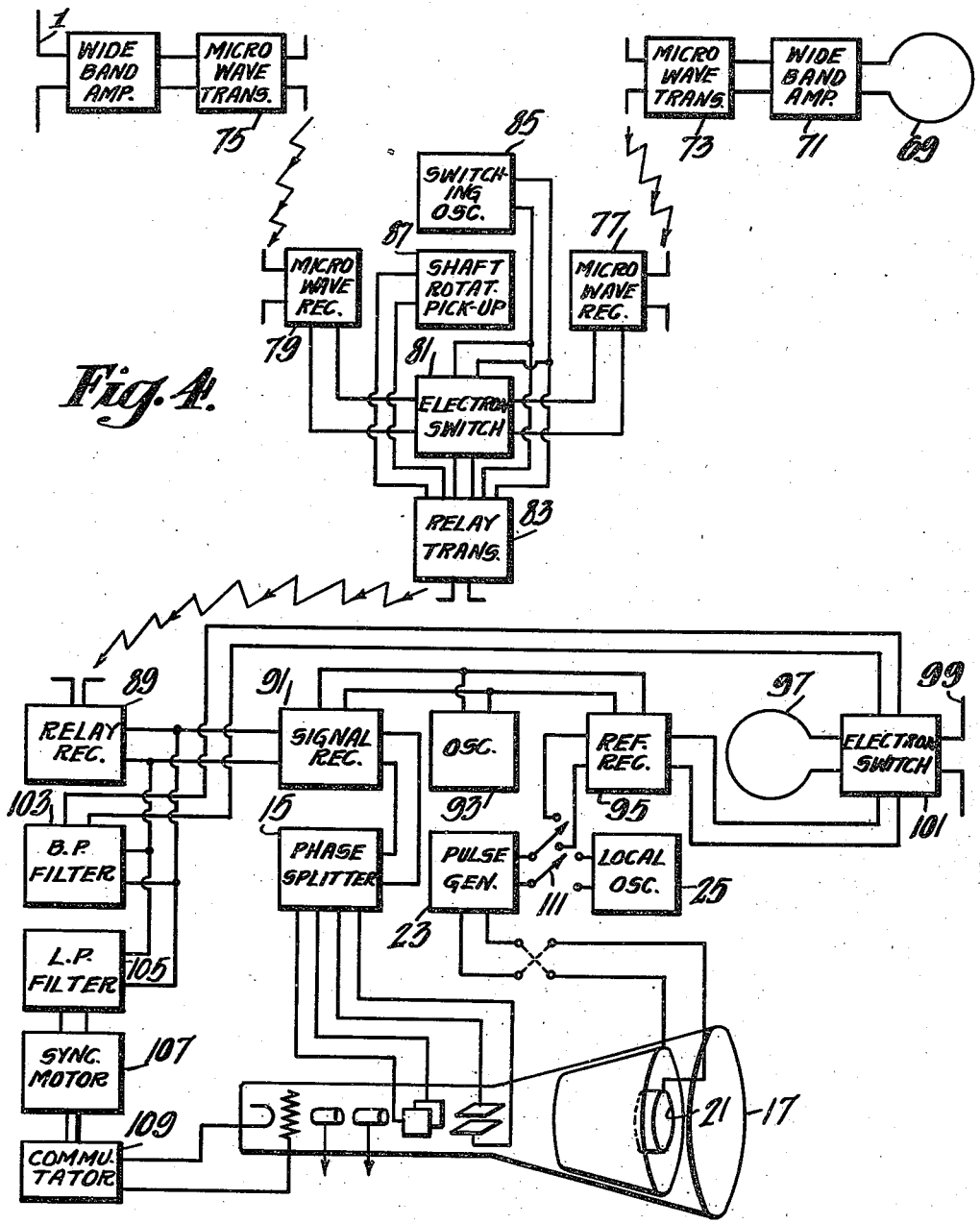

Patented Aug. 12, 1947

2,425,383

UNITED STATES PATENT OFFICE 2,425,383

RADIO DIRECTION FINDING

David G. C. Luck, Hightstown, N. J., assignor to Radio Corporation of America, a corporation of Delaware Application May 31, 1943, Serial No. 489,167

15 Claims. (Cl. 250—11)

1

This invention relates to radio direction finders, and more particularly to the elimination of errors in the operation thereof resulting from field pattern disturbances produced by the antenna of the direction finder itself.

Direction finders in general will give erroneous indications when signals are picked up in any other way than directly from the undisturbed field. In multiple element antenna systems such as those of the well known Adcock type, the field at each antenna element is distorted by currents induced in the other conductors, including the lead-in and supporting members which are necessary to make the complete wave collector system. To obtain the information necessary for the determination of the direction of arrival of a signal, it is necessary to sample the field in at least three spaced points. It has been proposed that the above requirements might be met without introducing the usual field distortion by observing the variations in the output of a single antenna as that antenna is moved bodily from place to place.

The principal object of the present invention is to provide a novel method of and means for applying the principle of a moving antenna and its resulting output to practical direction finding. This and other objects will become apparent to those skilled in the art upon consideration of the following description with reference to the accompanying drawing, of which:

Fig. 1 is a schematic diagram illustrating the physical arrangement of the several components comprising a preferred embodiment of the invention, Fig. 2 is a schematic block diagram of the circuits of the system of Fig. 1, Fig. 2a is a schematic circuit diagram of a modification of the system of Fig. 2, Figs. 3 and 3a are graphs illustrating typical indications provided by the system of Figs. 2 and 2a, and Fig. 4 is a schematic block diagram of a further modification of the system of Fig. 2.

According to the present invention a single antenna or field phase probe is moved uniformly along a fixed circular path at the end of a rotating radial arm. As the probe travels toward and away from the source of signals being received, the received signal frequencies are increased and decreased owing to the Doppler effect. This frequency shift will be too small for practical utility because the maximum attainable probe velocity must necessarily be insignificant as compared to the signal propagation velocity. However the received signal will change also in phase due to Doppler effect as the probe moves, by an amount equal to the change in electrical length of the signal path. This phase variation is capable of yielding the desired directional information if the course of its occurrence can be indicated. It is proposed herein to provide a local stable source of synchronous signal and to compare the probe output with the output of this local reference source.

Referring to Fig. 1, a vertical dipole comprising conductors 1 is supported at the end of an arm 4 which in turn is supported on a vertical shaft 5. The shaft 5 is supported in suitable bearings within a tower structure 7 or the like. The arm 4, shaft 5 and tower 7 are constructed of insulating material. The elements 1 are connected to a signal communicator 3 which may comprise a microwave radio transmitter modulated by the output of a broad band amplifier connected to the antenna 1. Since the construction of broad band amplifiers and microwave transmitters is well known to those skilled in the art, it is deemed unnecessary to show or describe those devices in detail.

A microwave receiver and the necessary measuring equipment for indicator means is provided at the lower end of the tower 7, as generally indicated by the reference numeral 9. This equipment should be at the axis of antenna revolution to avoid introduction of Doppler effects in the microwave link. Power for operation of the communicator 3 may be derived from batteries or by means of a local generator driven by a small propeller or by insulating shafts and gear connections to the tower 7. The shaft 5 is arranged to be driven at constant speed by an electric motor or the like, not shown, located at the bottom of the tower 7. Thus, the probe 1 is moved in a circular path remote from all disturbing conductive masses and electrical connections.

Referring to Fig. 2, a microwave receiver 11 is provided at the station 9. The output of the receiver 11 is applied to the input of a conventional communications receiver 13. The output circuit of the intermediate frequency amplifier of the receiver 13 is coupled through a phase splitter circuit 15 to the orthogonally related deflection means of a cathode ray tube 17. The phase splitter 15 provides two voltages resembling the output of the receiver 13 but in quadrature phase with respect to each other. The various electrodes of the tube 17 are connected to a power supply 19. The tube 17 is provided with a radial deflection electrode 21. A pulse generator 23 is coupled to the electrode 21. An oscillator 25 operating at the intermediate frequency of the receiver 13 is arranged to control the repetition rate of the pulse generator 23.

A commutator 27 is connected to the shaft 5 for rotation in synchronism with the motion of the antenna 1. The commutator 27 comprises two conductive bars 29 and 31 disposed on opposite sides of a cylindrical insulating member 33. A pair of brushes 35 and 37 are supported in an insulating block 39 at the end of an arm 41, pivoted for rotation about the axis of the commutator 27. The arm 41 is provided with a handle 43 and is connected through a shaft 45 to an indicator 47. A dial 49, calibrated in terms of bearing angles, is disposed adjacent the indicator 47 for cooperation therewith. A D.-C. bias source, such as a battery 51, is connected through the commutator 27 to the cathode and to an intensity control electrode of the tube 17.

The operation and adjustment of the above described system is as follows:

Signals picked up by the antenna 1 are applied through the microwave channel to the receiver 13 which provides intermediate frequency output to the phase splitter circuit 15. The output of the phase splitter 15 causes the beam of the cathode ray tube 17 to trace a circular path on the face of the tube. The pulse generator 23, under the control of the oscillator 25, actuates the electrode 21 to produce a sharp radial deflection of the circular scanning pattern once during each intermediate frequency cycle. See Fig. 3. The angular position of this radial deflection with respect to the face of the tube 17 depends upon the phase relationship between the intermediate frequency outputs of the receiver 13 and the oscillator 25. Thus, if the frequency of operation of the oscillator 25 is exactly equal to that of the output of the receiver 13, the radial deflection will oscillate in angular position between two limits 10' and 10" in accordance with variations in the radio frequency phase of the input to the receiver 13. As set forth above, such variations are produced by rotation of the antenna 1 about the shaft 5.

The intensity control electrode of the tube 17 is normally biased to reduce the intensity of the cathode ray beam so that only a faintly visible trace appears on the screen of the tube. Twice during each revolution of the antenna 1, the commutator 27 connects the source 51 to the intensity control electrode in such polarity as to overcome the bias and increase the intensity of the cathode ray beam. During these instants, visible notch-shaped indications are produced by the radial deflections. The points during the cycle of antenna rotation at which the indications are made visible may be varied by rotating the arm 41. As the arm 41 is rotated, the notch-like indications will tend to move together or separate from each other. The dial 49 may be so positioned with respect to the pointer 47 as to indicate the direction of minimum rate of change of phase, corresponding to azimuth of wave arrival, when the two visible indications are superimposed. This will occur for two reciprocal indications.

If the oscillator 25 is not maintained in exact synchronism with the frequency of the output of the receiver 13, the indication on the face of the tube 17 will rotate. This has substantially no effect on the accuracy of the bearing indication, so long as the handle 43 is operated to provide superimposition of the cathode ray indications.

The reciprocal bearing indication may be resolved by inverting one of the notches, providing indications of the type illustrated in Fig. 3a. This enables the operator to differentiate between the two notches 12 and 14. With rotation of the handle 43, the notches move in opposite directions. When the correct bearing is being indicated, one notch, for example the outwardly directed notch 12, moves in the same direction as the handle is rotated. When the reciprocal bearing is being indicated, the outwardly directed notch 12 moves in the opposite direction. Thus by noting which of the notches 12 and 14 follows the handle, the operator may ascertain whether he is reading the correct bearing or the reciprocal. Inversion of one of the notches may be obtained by reversing the polarity of the output of the pulse generator 23 for alternate periods of connection of the source 51 to the intensity control electrode.

Referring to Fig. 2a, an auxiliary commutator may be provided on the shaft 5 and connected between the generator 23 and the radial deflection electrode 21. Slip rings 53 and 55, respectively, are connected to conductive bars 57 and 59 at the same instants that the brushes 35 and 37 are connected together by one of the bars 27 and 29. The brushes 65 and 67 are supported in a holder, not shown, which is mechanically connected to the brush holder 39.

The length of the rotating arm 4 will be a compromise between sensitivity of bearing indication and confusion from signal diversity effects along the path swept. If the radius of the swept circle exceeds one wave length of the signal being received, there is the possibility of making an incorrect bearing setting because of overlapping travel of the indicating mark. In fact, this possibility exists for all radii exceeding ½ wave length, but the visibility of the full travel of the mark and the condition that the correct setting superimposes the marks at the center of this travel make it fairly easy to avoid wrong settings for radii up to a full wave length. This large sampled region of the signal field makes for a good sensitivity at bearing setting, while the total absence of any signal-bucking process makes for good absolute sensitivity. While the diversity effects with multiple-path transmission may cause difficulty, as with any other system, particularly with large radii of sweep, the unusually complete picture of signal behavior presented by the described indicator affords the operator every opportunity to overcome diversity errors by proper exercise of judgment.

Various modifications of the invention are possible. For example, the bearing setting requires only the qualitative judgment of whether two alternately flashing marks do or do not correspond in position. Therefore, some drift of both marks together can be tolerated without unduly increasing difficulty or uncertainty of setting. However, it may be more convenient to use such an instrument if drift is eliminated. This may be done by providing a fixed antenna and a local receiver at a point far enough from the moving field probe antenna to avoid disturbance of the field being measured and deriving a reference phase voltage directly from the incoming signal, as set forth in more detail below.

With the described system, polarization errors are inherently non-existent provided the radio receiver is well sheltered against direct signal pickup. However, no single antenna will operate efficiently on all incoming signals so unfavorable working conditions will sometimes occur. A vertical rod antenna and horizontal loop antenna are, between them, sensitive to all signals except those coming down from a very steep elevation. Such steeply incident signals do not have any marked azimuthal directionality and lack of sensitivity to them is relatively unimportant. With both types of antenna available, unfavorable conditions for operation of the equipment itself may be avoided.

Referring to Fig. 4, the counterweight of the system of Fig. 1 is replaced by a horizontal loop antenna 69, coupled through a wide band amplifier 71 to a microwave transmitter 73. The transmitter 73 operates on a somewhat different frequency from that of the microwave transmitter associated with a vertical rod antenna 1. Microwave receivers 77 and 79, tuned to respond to the transmitters 73 and 75, respectively, are coupled through an electronic switch 81 to a relay transmitter 83. The transmitter 83 operates at a frequency different from those of the transmitters 73 and 75. The switch 81 comprises a toggle circuit arranged to connect selectively the outputs of the receivers 77 and 79 to the relay transmitter 83. A local oscillator 85 is connected to the switch 81 and to the transmitter 83. A pickup device 87 is coupled to the shaft supporting the antennas to provide an A.-C. signal corresponding to the angular positions of the antennas. The output of the pickup 87 is applied to the transmitter 83.

The bearing indicating equipment, which is located at a point remote from the antennas and the relay transmitter, includes a receiver 89 arranged to operate in conjunction with the transmitter 83. The output of the receiver 89 is applied to a receiver 91 similar to the receiver 13 of Fig. 2 but provided with a separate oscillator 93. A receiver 95 similar to the receiver 91 is also connected to the oscillator 93. Reference antennas 97 and 99 are coupled through an electronic switch 101 to the input circuit of the receiver 95. The output of the receiver 89 is connected through a band pass filter 103 tuned to the frequency of the switching oscillator 85 to the switch 101. The output of the receiver 89 is also connected through a low pass filter 105 to a synchronous driver motor 107. The motor 107 is coupled to a commutator 109 similar to the commutator 27 of Fig. 2.

The output of the receiver 91 is coupled through a phase splitter 15 to the orthogonally related deflection plates of the cathode ray tube 17, as in the system of Fig. 2. The radial deflection electrode 21 of the tube 17 is connected to the pulse generator 23. A double throw switch 111 is provided for connecting the generator 23 to the local intermediate frequency oscillator 25 or to the reference receiver 95.

The operation of each channel of the system of Fig. 4 is essentially similar to that of Fig. 2. The outputs of the wave collectors 1 and 69 are applied through microwave channels 75, 79 and 73, 77, respectively, to the electronic switch 81. The oscillator 85 actuates the switch 81 to apply alternately the outputs of the microwave receivers 77 and 79 to the relay transmitter 83. The outputs of the shaft rotation pickup 87 and the switching oscillator 85 are also applied to the relay transmitter 83. Thus the relay transmitter is modulated alternately by the outputs of the microwave receivers 77 and 79 and is also modulated by the outputs of the pickup 87 and oscillator 85.

The output of the relay receiver 89 is identical with the composite input to the transmitter 83. The components of this output are separated by means of the filters 103 and 105. The band pass filter 103 is tuned to pass the signal derived from the switching oscillator 85. The low pass filter 105 is adjusted to reject all frequencies higher than that produced by the shaft rotation pickup 87. The output of the filter 105 is applied to the synchronous motor 107 to drive the commutator 109 synchronously with the revolution of the antennas 1 and 69. The output of the relay receiver 89 is also applied to the receiver 91, providing transmitter frequency output which is applied through the phase splitter 15 to the cathode ray tube 17, as in the system of Fig. 2, producing a circular trace on the screen of the tube 17. The pulse generator 23 provides radial deflections of the circular trace, as described in connection with the system of Fig. 2. The repetition frequency of the generator 23 may be controlled by means of the oscillator 25 or by means of the output of the reference receiver 95, depending upon the position of the double throw switch 111. The input circuit of the receiver 95 is connected through the electronic switch 101 to the reference antennas 97 and 99. The switch 101 is controlled by the output of the band pass filter 103.

Owing to the operation of the electronic switches 81 and 101, the indicator system is operated alternately from dipoles 1 and 99 and loops 69 and 97. Since the frequency of the circular sweep pattern on the face of the tube 17 will greatly exceed the switching frequency which in turn will be much greater than the antenna rotation frequency, patterns derived from both signals will appear to be present individually on the screen of the tube. This enables an experienced operator to compare directly the responses to vertical electric and vertical magnetic fields and to select that which is more likely to provide an accurate bearing indication.

The reference phase signal may be derived either from the local oscillator 25 or from the antennas 97 and 99, providing a stationary pattern. The local oscillator phase reference is useful in the case of weak and noisy signals or those subject to intense diversity effects. Also the phase indicator itself functions as an extremely delicate tuning indicator.

Although specific embodiments of the invention have been described, it will be apparent to those skilled in the art that many modifications are possible. For example, electronic switching means may be substituted for the commutator 109, controlled by the output of the low pass filter 105 through a low frequency phase shifter for setting and reading the bearing indications.

I claim as my invention:

1. A radio direction finder system including a wave collector element, means for revolving said element in a circular path about a fixed point whereby a signal picked up by said element is phase modulated at a frequency equal to the frequency of revolution of said element and in a phase determined by the azimuth of arrival of said signal, a cathode ray tube provided with orthogonally disposed deflection means, radial deflection means and a beam intensity control electrode, means for applying said phase modulated signal to said orthogonally related electrodes to produce circular deflection of the cathode ray beam of said tube whereby a circular scanning pattern is produced on the screen of said tube, a pulse generator connected to said radial deflection means, means for controlling said generator to produce pulses at a repetition frequency substantially equal to the carrier frequency of said phase modulated signal, means for generating voltage pulses at a repetition rate equal to twice said frequency of revolution, means for applying said last mentioned pulses to said radial deflection control electrode whereby two discrete radial deflections are produced on said circular scanning path, and means for varying the phase of said last mentioned pulses to vary the angular positions of said deflections upon said scanning pattern.

2. A radio direction finder system including a wave collector element, means for revolving said element whereby a signal picked up by said element is phase modulated in a phase determined by the azimuth of arrival of said signal, a cathode ray tube provided with radial deflection means and a beam intensity control electrode, means for applying said phase modulated signal to said cathode ray tube to produce circular deflection of the cathode ray beam of said tube whereby a circular scanning pattern is produced on the screen of said tube, a pulse generator connected to said radial deflection means, means for controlling said generator to produce pulses at a repetition frequency substantially equal to the carrier frequency of said phase modulated signal whereby radial deflections are produced on said circular scanning pattern, means for generating voltage pulses at a repetition rate equal to twice the frequency of revolution of said wave collector element, means for applying said last mentioned pulses to said intensity control electrode whereby said radial deflections are intensified at two discrete points on said circular scanning pattern, and means for varying the phase of said last mentioned pulses to vary the angular positions of said intensified deflections upon said scanning pattern.

3. The invention as set forth in claim 2, including means for converting said phase modulated signal to a frequency which is relatively low as compared to the frequency of said signal as picked up by said collector element.

4. The invention as set forth in claim 2, wherein said means for controlling the frequency of said pulse generator comprises a local oscillator.

5. The invention as set forth in claim 2, wherein said means for controlling the frequency of said pulse generator comprises an auxiliary wave collector and a radio receiver coupled to said pulse generator.

6. The invention as set forth in claim 2, including means for reversing the polarity of each alternate one of said last mentioned pulses.

7. A radio direction finder system including a wave collector element, means for revolving said element whereby a signal picked up by said element is phase modulated in a phase determined by the azimuth of arrival of said signal, means for locally generating a voltage having a frequency substantially equal to the carrier frequency of said phase modulated signal, a cathode ray tube, and means for applying said phase modulated signal and said locally generated voltage to said cathode ray tube to produce indications on the face of said cathode ray tube characteristic of the instantaneous phase relationship between said phase modulated signal and said locally generated voltage.

8. A radio direction finder system including a wave collector element, means for revolving said element whereby a signal picked up by said element is phase modulated in a phase determined by the azimuth of arrival of said signal, means for locally generating a voltage having a frequency substantially equal to the carrier frequency of said phase modulated signal, a cathode ray tube, means for applying said phase modulated signal and said locally generated voltage to said cathode ray tube to produce indications on the face of said cathode ray tube of the instantaneous phase relationship between said phase modulated signal and said locally generated voltage, means for locally generating a second voltage of frequency equal to the frequency of revolution of said collector means, means for adjusting the phase of said second locally generated voltage, and means for indicating the extent of the adjustment of said second locally generated voltage with respect to a predetermined phase.

9. A radio direction finder system including plurality of wave collector elements each responsive to a differently polarized field component, means for revolving said elements whereby signals picked up by each of said elements is phase modulated in a phase determined by the azimuth of arrival of a signal, a cathode ray tube provided with radial deflection means and a beam intensity control electrode, means for alternately applying the phase modulated signals from said wave collector elements to said cathode ray tube to produce circular deflections of the beam of said tube whereby circular scanning patterns are produced on the screen of said tube, a local source of voltage having a frequency substantially equal to the carrier frequency of said phase modulated signals, means for applying said locally derived voltage to said radial deflection means, means for momentarily increasing the intensity of said cathode ray beam twice during each revolution of said collector elements whereby two individual patterns are produced on the face of said cathode ray tube, each of said patterns comprising a pair of radially directed notch-like indications, and means for adjusting the phase of said variations in the intensity of said beam to bring into juxtaposition at least one pair of said notch-like indications.

10. The invention as set forth in claim 9, wherein said local source of voltage comprises a group of auxiliary wave collector elements having response characteristics similar to those of said first mentioned wave collector elements, and a radio receiver connected to said auxiliary wave collector.

11. A radio direction finder system including wave collector means, means for revolving said wave collector means whereby a signal picked up by said wave collector means is phase modulated in a phase determined by the azimuth of arrival of said signal, microwave transmitter means in proximity to said wave collector means and connected thereto to be modulated by signals picked up by said wave collector means, a microwave receiver arranged to respond to signals transmitted by said transmitter whereby said receiver produces an output which is phase modulated in accordance with the modulation of the signals picked up by said wave collector means, a cathode ray tube provided with radial deflection means and a beam intensity control electrode, means for applying the output of said microwave receiver to said cathode ray tube to produce circular deflection of the cathode ray beam of said tube whereby a circular scanning pattern is produced on the screen of said tube, a pulse generator connected to said radial deflection means, means for controlling said pulse generator to produce pulses at a repetition frequency substantially equal to the carrier frequency of the voltage applied to said cathode ray tube whereby radial deflections are produced on said circular scanning pattern, means for generating voltage pulses at a repetition rate equal to twice the frequency of revolution of said wave collector means, means for applying said last mentioned pulses to said intensity control electrode whereby said radial deflections are intensified at two discrete points on said circular scanning pattern, and means for varying the phase of said last mentioned pulses to vary the angular positions of said intensified deflections upon said scanning pattern.

12. The invention as set forth in claim 11, including means for reversing the polarity of each alternate one of said last mentioned pulses.

13. The invention as set forth in claim 11, including means for converting the output of said microwave receiver to a frequency which is relatively low as compared to the carrier frequency of said signal as picked up by said collector means.

14. The invention as set forth in claim 11 wherein said means for controlling the frequency of said pulse generator comprises an auxiliary wave collector and a radio receiver coupled to said pulse generator.

15. The invention as set forth in claim 11 wherein said means for controlling the frequency of said pulse generator comprises a local oscillator.

DAVID G. C. LUCK.